C. E. WRIGHT.
BAND SAW GUIDE.
APPLICATION FILED NOV. 18, 1908.
1,054,738.
Patented Mar. 4, 1913.
2 SHEETS—SHEET 1.
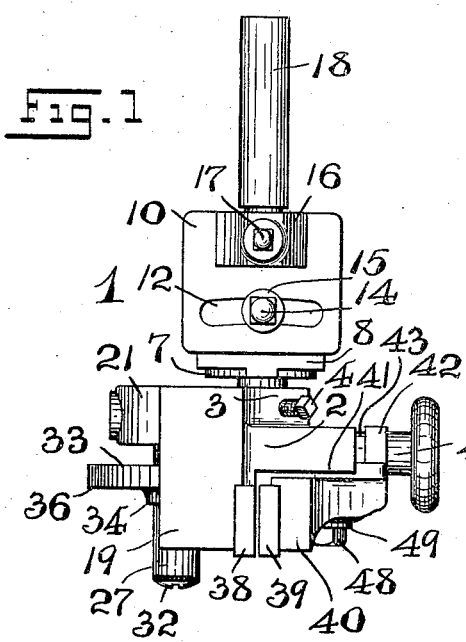
Fig. 1
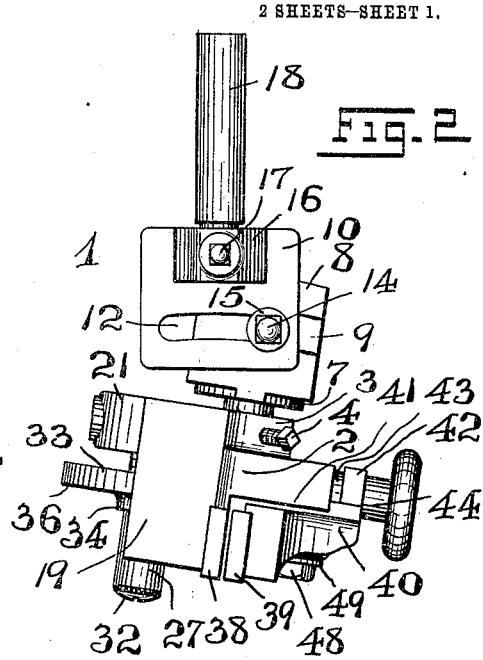
Fig. 2
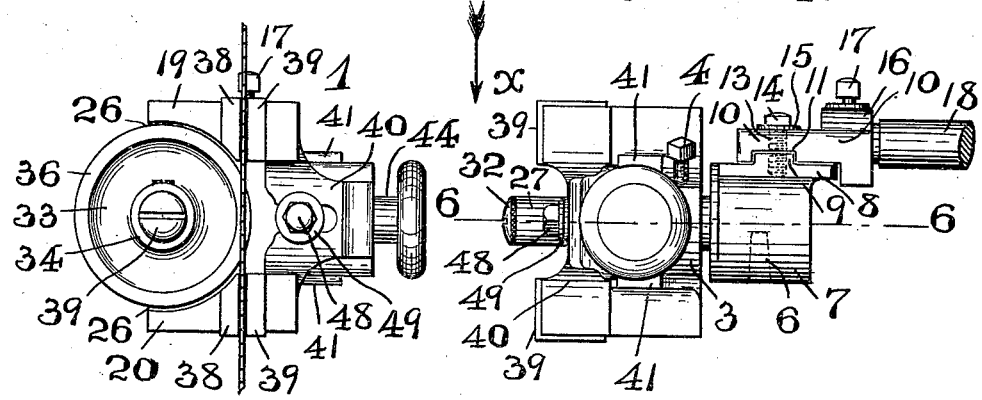
Fig. 3
Fig. 4
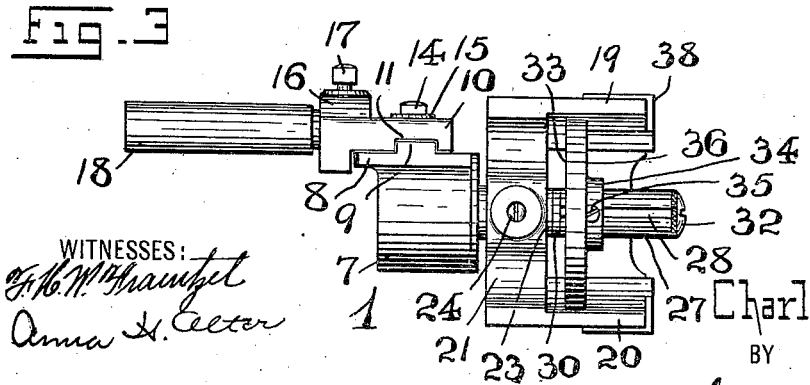
Fig. 5
WITNESSES:
INVENTOR:
Charles E. Wright,
BY
Fraentzel and Richards,
ATTORNEYS.

C. E. WRIGHT.
BAND SAW GUIDE.
APPLICATION FILED NOV. 18, 1908.
1,054,738.
Patented Mar. 4, 1913.
2 SHEETS—SHEET 2.
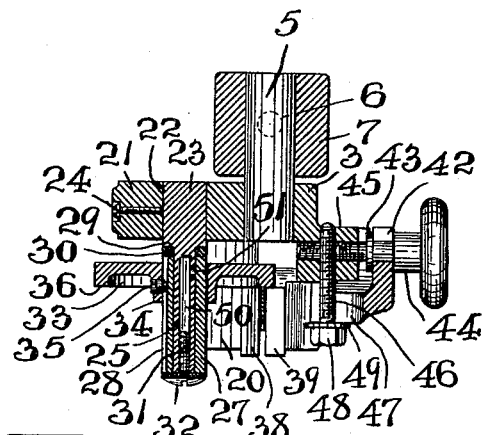
Fig. 6
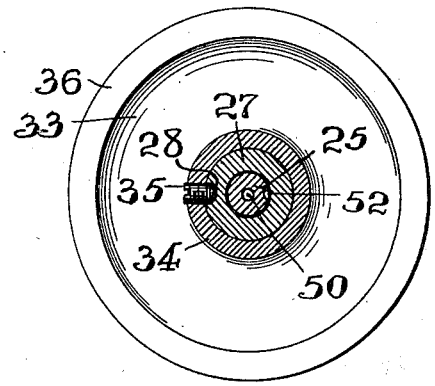
Fig. 7
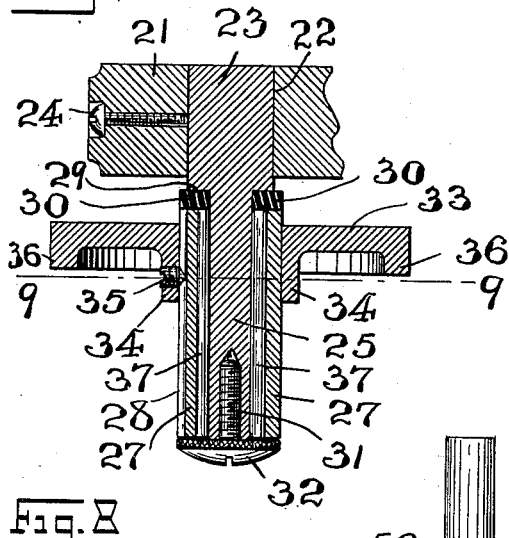
Fig. 8
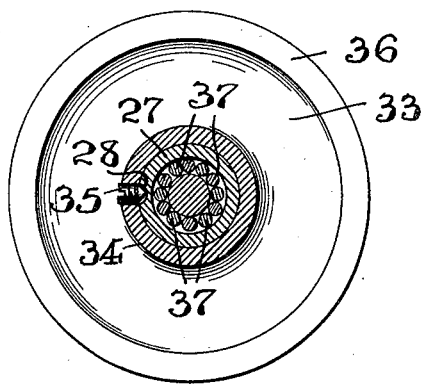
Fig. 9
Fig. 10
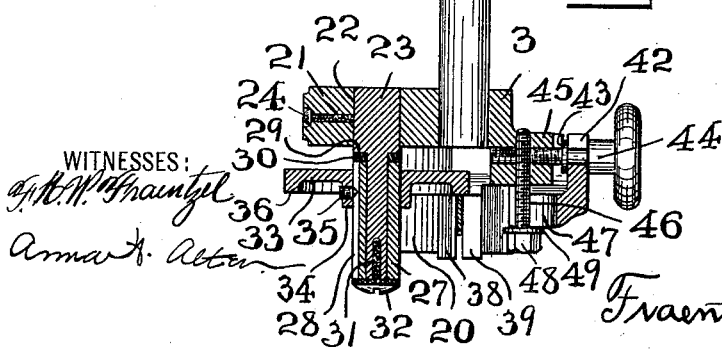
WITNESSES:
M. W. Fraentzel
Anna A. Alter
INVENTOR:
Charles E. Wright,
BY
Fraentzel and Richards
ATTORNEYS
COLUMBIA PLANOGRAPH CO., WASHINGTON, D. C.

UNITED STATES PATENT OFFICE.

CHARLES E. WRIGHT, OF KENILWORTH, NEW JERSEY.

BAND-SAW GUIDE.

1,054,738. Specification of Letters Patent. Patented Mar. 4, 1913.

Application filed November 18, 1908. Serial No. 463,177.

*To all whom it may concern:*

Be it known that I, CHARLES E. WRIGHT, a citizen of the United States, residing at Kenilworth, in the county of Union and State of New Jersey, have invented certain new and useful Improvements in Band-Saw Guides; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention has reference, generally, to improvements in band saw guides, and, my present invention has for its principal object to provide a novel, simple, durable and economically constructed band saw guide, which can be readily secured to any usual construction of band saw machines or apparatus, either above or below the table, and a guiding adjustable holder or element which is capable of swinging movement, to either side, so as to be easily adjusted to the plane of movement of the band saw, for properly guiding the moving saw, and in which actual friction or pressure of the parts on either side or the back of the saw is entirely overcome.

A further object of this invention is to provide a novel arrangement of revolving disk or wheel against which the back of the saw rests so that the disk or wheel is carried by the moving saw, the said disk or wheel being slidably arranged upon a spindle or journal for adjustment against the back of the saw, instead of the disk or wheel being fixed in a stationary position upon the spindle or journal, and the latter being movably arranged in a bearing as heretofore, which is of the greatest importance beceause in some constructions of band saw machines, especially below the table, the distance between the machine-casting or the spindle that supports the guide roller will not admit the appliance of non-friction roller guides, as ordinarily constructed, carrying spindles or journals adjustable to accommodate different widths of band saw blades.

This invention has for its further object, to provide an improved side guidance which may be rigidly locked in position so that the band saw will be properly guided and still give a true accurate lead, although it may be somewhat out of its proper vertical alinement, and the parts of the device being adapted to be brought into such fixed positions so that the guide will not become loose through the motion of the saw or through the jar of the machinery. This is further of great importance where metal is cut up into lengths or lumber re-sawed, requiring an accuracy which hitherto has never been fully insured in operating machinery of this class.

Other objects of this invention not at this time more particularly enumerated will be clearly understood from the following detailed description of the same.

With the various objects of the present invention in view, the said invention consists, primarily, in the novel band-saw guide hereinafter set forth; and, the invention consists, furthermore, in the novel arrangements and combinations of the devices and parts, as well as in the details of the construction of the same, all of which will be more fully described in the accompanying specification, and then finally embodied in the clause of the claim which is appended to and which forms an essential part of this specification.

The invention is clearly illustrated in the accompanying drawings, in which:—

Figures 1 and 2 are two top or plan views of a band-saw guide embodying the principles of the present invention, showing the same in two of its adjusted positions. Fig. 3 is a front elevation of the same; and Figs. 4 and 5 are the two side elevations of the band-saw guide. Fig. 6 is a horizontal sectional representation of the parts, said section being taken on line 6—6 in Fig. 4, looking in the direction of the arrow $x$; and Fig. 7 is a front view of the disk or wheel against which the back of the band-saw moves, said disk or wheel being made on an enlarged scale, and the hub of the disk or wheel and the spindle or journal upon which the disk or wheel is slidably disposed being represented in transverse section. Fig. 8 is a horizontal section of a modified disk or wheel, and the spindle or journal upon which it is slidably arranged, and a portion of the main body of the band-saw guide; and Fig. 9 is a transverse section taken on line 9—9 in said Fig. 8. Fig. 10 is a horizontal section, similar to the section represented in Fig. 6, of a fixed or non-oscillating band-saw guide provided with a slidable and adjustable wheel or disk of the general construction shown in said Fig. 6.

Similar characters of reference are employed in all of the above described views, to indicate corresponding parts.

Referring now more particularly to Figs. 1 to 6 inclusive, the reference-character 1 indicates the complete band-saw guide showing one embodiment of my present invention. The reference-character 2 denotes the body of the guide which is made with a suitable bearing-portion 3 in which is arranged and is secured, preferably by means of a set-screw 4, or other suitable fastening means, a rearwardly extending stem 5. Suitably secured upon the projecting end-portion of this stem, by means of a pin 6, as indicated in dotted outline in Figs. 4 and 6, or by means of any other suitable fastening device, is a tubular supporting-element, as 7, which is formed upon its upper surface with a flattened portion 8 forming a table for the purposes to be presently described. This table as shown is provided with an upwardly extending and preferably arc-shaped guiding rib or projection 9 extending laterally from side to side of said table. The said table is movably arranged against the under surface of a guide-plate 10, said plate being provided in its under surface with an arc-shaped groove or channel 11 into which the rib or projection 9 is fitted and is movably arranged. The said guide-plate 10 is made with an elongated and arc-shaped opening, as 12, in alinement with said groove or channel 11 and the rib or projection 9. Suitably screwed into said rib or projection is a stud or bolt 13, which extends in an upward direction into and through said arc-shaped opening 12, a head 14 upon said stud or bolt and a washer 15 retaining the said parts in their operatively assembled relation, as will be clearly evident. The said guide-plate 10 is also provided with a tubular enlargement or projection 16 in which is fitted and is secured by means of a set-screw 17, or other suitable fastening means, a suitable supporting stem or rod 18 by means of which the band-saw guide is secured in its proper position upon the band-saw machine in the position where desired.

The previously mentioned guide-body 2 is made with a pair of elements or members 19 and 20 which are connected at the back by a suitable wall 21. This wall is provided with a receiving hole or socket 22 for the reception of a spindle or journal 23 which is fixed or secured in a non-rotatable position with relation to said wall 21 by means of a suitable screw 24, or other suitable fastening means. The said spindle or journal 23 is made with a reduced portion 25 which extends in a forward direction in the space 26 formed between said two elements or members 19 and 20. Upon this reduced portion 25 of the spindle or journal 23 is rotatably arranged a suitable sleeve 27 which is formed with a longitudinally extending slot or groove 28. Between the inner end-portion of said sleeve 27 and the shoulder 29 is a disk or washer 30, of fiber, leather, or other similar material, and the said sleeve is retained in its operative position upon said reduced portion 25 by means of a screw 31, the head 32 of which holds said sleeve in place, as will be clearly evident. Adjustably arranged upon said sleeve 27 is the previously mentioned disk or wheel 33, formed with a hub 34 in which there is a set-screw 35 for rigidly connecting said disk or wheel upon said sleeve, after it has been adjusted, so that it will turn with the said sleeve. The said disk or wheel is provided upon its outer face, at or near its periphery, with a circular flange 36. By slightly unscrewing the set-screw 35 the said disk or wheel can be moved in a backward or forward direction upon said sleeve 27, without in the least disturbing the fixed position of the spindle or journal 23, so as to bring the flange against the back of the band-saw, against which said back bears when the saw is in use, the disk or wheel being secured in its adjusted position by again tightening the set screw 35, so as to prevent any further longitudinal movement or slipping of the said disk or wheel upon said sleeve. It will be clearly evident, that the flange 36 forms the sole bearing for the back of the saw when in use, and all wear that takes place affects the flange evenly so that no shoulder is formed for the side of the saw to bear against. If desired, a set of anti-friction rollers 37 may be placed between the reduced portion 25 of the spindle or journal 23 and the sleeve 27, substantially as shown in Fig. 8, to reduce the friction between the assembled parts, as will be clearly understood.

As shown, the elements or members 19 and 20 are provided with the upper and lower guide-plates 38 made of chilled metal, and 39 are another pair of guide-plates, also of chilled metal and secured to a slide 40 adapted to move in ways 41. The outer end of said slide is provided with a yoke or bearing-portion 42 which is engaged upon opposite sides by a collar 43 and the shouldered portion of an adjusting screw 44. The screw-threaded shank of said screw engages with a hub 45 forming a part of the main guide-body 2. After adjustment of the said slide has been made it is locked by means of a bolt 46, which passes through a slot 47 in said slide, said bolt 46 being provided with a head 41 and washer 49 which can be tightened down against said slide upon the opposite bounding surface-portions of the slot 47.

Instead of providing the main guide-body 2 with the tubular supporting-element 7 and an adjustable guide-plate 10, as shown in Figs. 1, 2, 4, 5 and 6, I may dispense with these parts, and in lieu thereof I may suitably secure to the bearing-portion 3 any suitably formed and rearwardly extending stem or rod, as 50, as indicated in Fig. 10 of the drawings, and by means of which the saw-guide can be secured in the desired position upon a band-saw machine or apparatus, as will be clearly evident.

The swiveled or pivoted arrangement of the body 2 with reference to the supporting element 7 of the saw-guide is of vital importance because the turning of the saw-blade pivotally from the cutting edge to the heel of the saw can be made regardless of the width of the saw.

It will be understood that band-saws are stretched over two wheels, the ends of the band being brazed together and running in one continuous direction. These band-saws, however, are not stretched so firmly but what a pressure against the blade, either when the saw is in use or when idle, would easily crowd the blade out of its natural position, unless proper guidance-support is given. This is accomplished by my novel means of swinging the heel of the guide which is bolted upon the main guide-holder by means of the stud or bolt 13. It will be clearly evident, that unless the arc of the circle is laid out in a perfect radius having its center in the central axis of said bolt, when the bolt is loosened and the guide swiveled either to the right or left beyond a perfect alinement, that the front pivot-point between the two guiding jaws 38 and 39 might possibly be thrown to one side or the other. It is admitted that if the swiveling members are loosely fitted and made to swing on most any arc, that the guides could be swiveled around and properly adjusted to get the same results, but the operator could not ascertain this to a certainty, unless with every adjustment the operator takes a square and puts it upon the table for lining up the saw. This is what I intend to avoid, for adjustments have to be made frequently, and in the hands of an inexperienced or careless operator, with the known forms of guides as at present adjusted, the parts are more apt to be out of alinement than in alinement, causing the wearing off of the saw-teeth on one side, often after a very little while. This trouble arises from the saw not being in perfect alinement at the front or toothed cutting edge of the band. The saw must be kept at a perfect lead, cutting straight ahead, otherwise the saws will bind or crowd sidewise, to the injury of the saw, causing the "set" to shortly wear out. In my present construction, the swivel adjustment which is locked in position by the bolt 13 is laid out on a given circle, which will permit of the guide being moved, if necessary, into any position, the pivotal center or point of the main body 2 of the saw-guide being at a point at the front of and directly between the two guiding plates 38 and 39. With the attachment having been properly adjusted at the factory, an inexperienced operator, by loosening the bolt 13, can swivel the guide-body to the right or left, as the case may require, to give a perfect lead to the saw, at the same time insuring the saw being in perfect vertical alinement, and consequently saving a great amount in general cost, and wear and tear, resulting from improper adjustments.

Referring to Fig. 6 of the drawings, it will be seen, that the spindle or journal 23 is continued back of the screw-threaded shank of the screw 31 with a bored-out portion 50, which forms a reservoir closed at its forward end by means of said screw 31. A duct or hole 51 leads from said reservoir to the outside of the spindle or journal 23, and which communicates with a groove 32, see Fig. 7, extending longitudinally upon the outside of the said spindle or journal. By removing the screw 31, the said reservoir can be filled with a lubricating oil, whenever necessary, the duct 51 and groove 52 conducting the oil between the outside of the spindle or journal 23 and the sleeve 27 which is arranged thereon, as will be clearly understood.

I am aware that some changes may be made in the arrangements and combinations of the various devices and parts, as well as in the details of the construction of the same without departing from the scope of my present invention as defined in the appended claim. Hence I do not limit my invention to the exact arrangements and combinations of the devices and parts as described in the foregoing specification, nor do I confine myself to the exact details of the construction of the said parts as illustrated in the accompanying drawings.

I claim:—

A saw-guide comprising a main body, a fixed spindle extending from said main body, said spindle having a reduced portion, a sleeve rotatably mounted upon said reduced portion, a headed screw for securing said sleeve against displacement from said reduced portion, said sleeve being provided with a longitudinally extending groove, a disk formed with a hub slidably arranged upon said sleeve, said sleeve being capable of rotation by contact of the saw with the face thereof, and a set-screw connected with said hub, said screw having a portion extending into the groove in said sleeve for securing the disk in its adjusted position.

In testimony, that I claim the invention set forth above I have hereunto set my hand this 5th day of November, 1908.

CHARLES E. WRIGHT.

Witnesses:
 FREDK. C. FRAENTZEL,
 FREDK. H. W. FRAENTZEL.